March 9, 1937.　　　H. W. WILLIAMS　　　2,073,189
PANTOGRAPH TROLLEY
Filed June 22, 1933　　　2 Sheets-Sheet 1
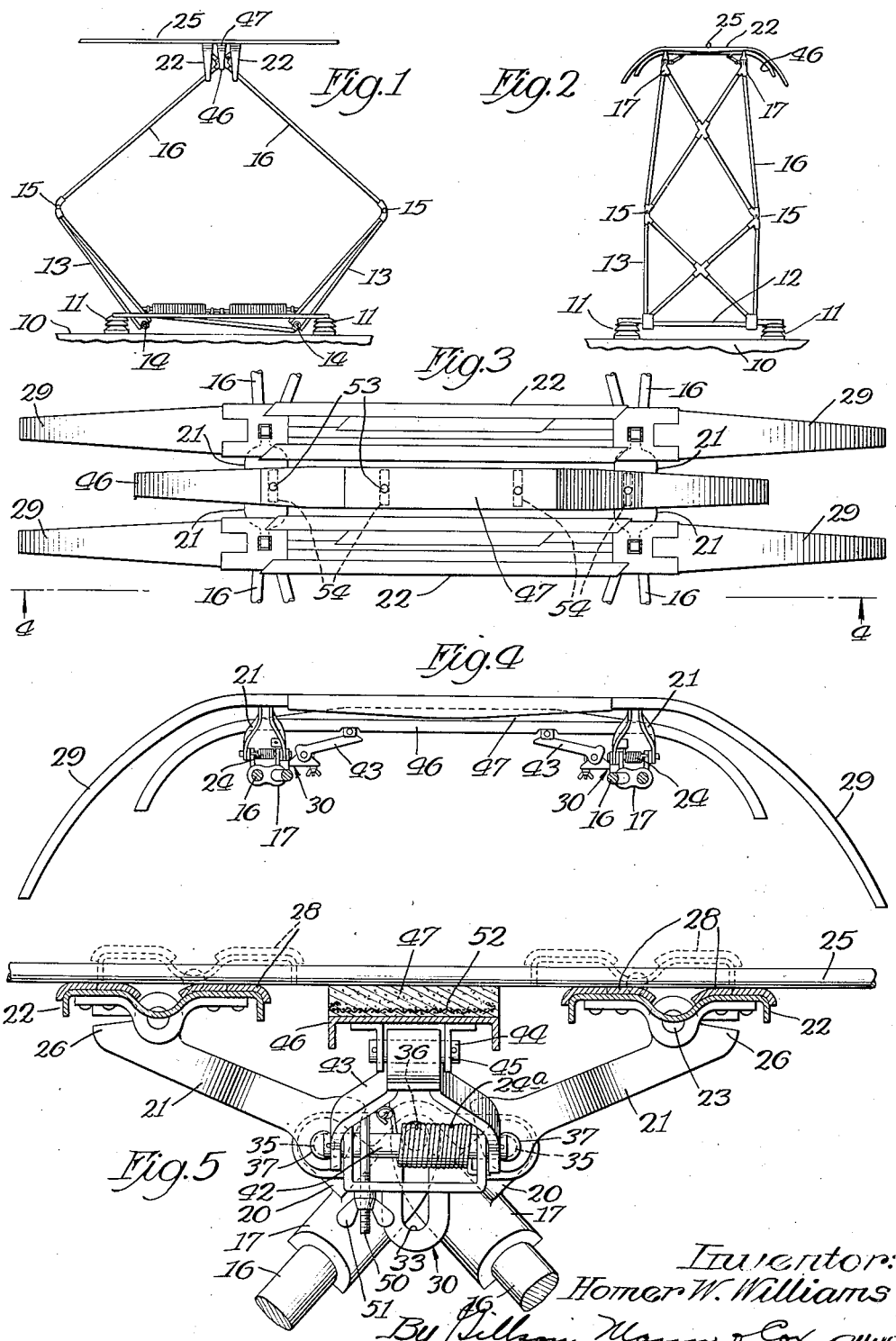
Inventor:
Homer W. Williams March 9, 1937.  H. W. WILLIAMS  2,073,189
PANTOGRAPH TROLLEY
Filed June 22, 1933   2 Sheets-Sheet 2
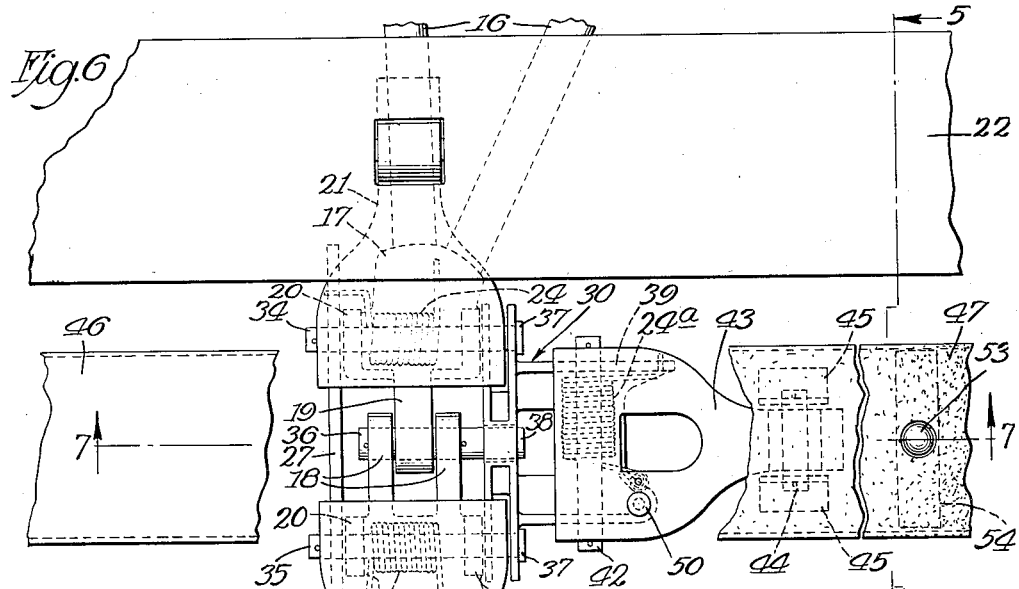
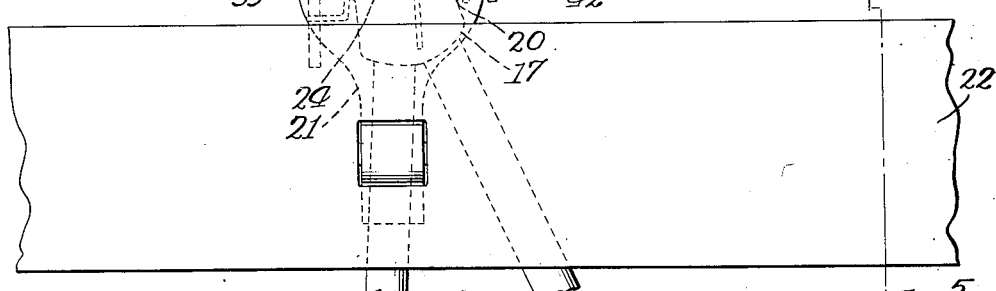
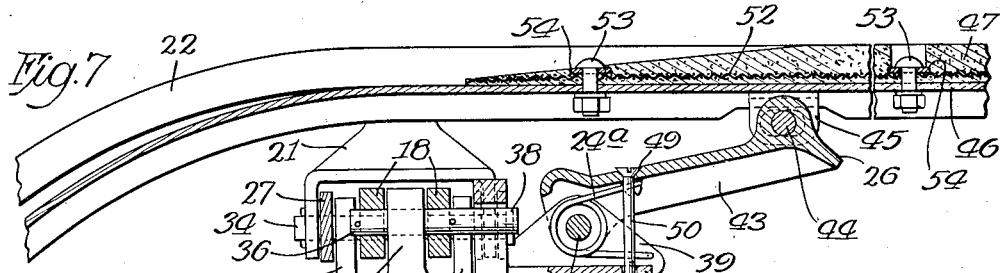
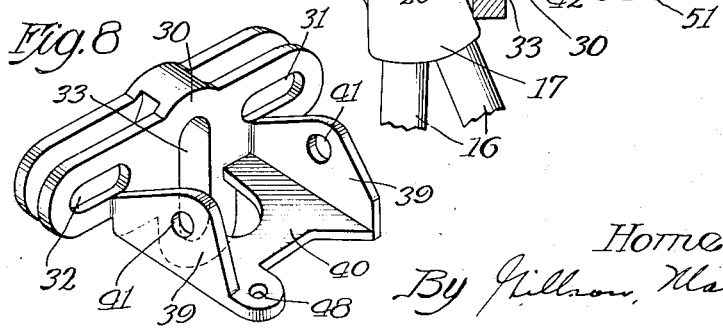
Inventor:
Homer W. Williams
By Gillson, Hann & Cox, Attys.

Patented Mar. 9, 1937

2,073,189

UNITED STATES PATENT OFFICE 2,073,189

PANTOGRAPH TROLLEY

Homer W. Williams, Tacoma, Wash.

Application June 22, 1933, Serial No. 677,028

10 Claims. (Cl. 191—55)

This invention relates principally to sliding shoe pantographs used for current collecting on electric locomotives and cars, two familiar forms of which are illustrated on page 941 of the Locomotive Cyclopedia, 1922. As a rule the shoes of these devices are each provided at either side on top with copper wearing strips, and the spaces between those strips are filled with a mixture of two parts motor grease and one part flake graphite, or some such soft lubricant.

In practice this excellent dust-collecting material gets smeared over the contact strips, where it dries and hardens more or less according to weather and other conditions, and becomes somewhat of an abrasive as well as an electrical insulator. It also frequently happens that the soft grease is smeared on the trolley wires about the terminals, falls on top of the locomotives, and otherwise goes to waste, while little lubrication is given out on the road where lubrication is most needed.

The principal object of this invention is to overcome these objections and provide proper lubrication between the contact shoes and the trolley wire. And, generally speaking, this is done by supplying an additional contact shoe faced with a relatively hard lubricant supply that cannot be so readily mishandled and perverted from its purpose. Thus the main contact shoes are left to perform their function of collecting current, and the function of lubrication is performed by the auxiliary shoe.

One embodiment that has proved satisfactory in service is illustrated in the drawings, where Fig. 1 is a diagrammatic side elevation of the pantograph trolley;

Fig. 2 is a diagrammatic end view of Fig. 1;

Fig. 3 is a plan view of the contact shoes and fragments of the pantograph framework;

Fig. 4 is a sectional view taken on the line 4—4 of Fig. 3;

Fig. 5 is a transverse sectional view taken on the line 5—5 of Fig. 6;

Fig. 6 is an enlarged plan view corresponding to a portion of Fig. 3;

Fig. 7 is a longitudinal section on the line 7—7 of Fig. 6; and

Fig. 8 is a perspective view of a bracket by which the auxiliary contact shoe attachment is mounted on the movable framework of the pantograph.

But these specific drawings, and the correspondingly specific description, are used for the purpose of illustration only, and are not intended to cover all other embodiments of which the invention is capable.

In Figs. 1 and 2, the numeral 10 indicates a fragment of the roof of an electric locomotive or car equipped with insulators 11, on which is mounted the base of the pantograph, generally indicated at 12. The movable framework includes two lower frames 13, each pivoted at the bottom on a shaft 14, mounted in the frame 12, and pivoted at 15 to the bottom of the corresponding one of two upper frames 16. The latter terminate in upper frame castings 17, two for each. And the castings are provided with perforated arms 18 and 19 (Fig. 6), which are pivoted together to form the upper joint of the pantograph frame.

Each upper frame casting also carries two perforated arms 20, which receive a pivot pin or fulcrum for what are usually called lever supports 21, that are pivotally connected at their upper ends to the contact shoes 22 by hinge pins 23. There is one lever support for each upper frame casting, and hence there are two lever supports for each contact shoe 22. The pivots and fulcra are on axes substantially parallel to the main body of the shoes. The fulcra for the lever supports also receive coil springs 24, stressed to urge the lever supports to raised position, whereby the shoes are yieldingly held in engagement with the trolley 25, the upper movement being limited by shoulders 26 (Fig. 5) striking the under side of the shoes.

The fulcra for the lever supports are connected in pairs by a sliding bar 27 (Fig. 6).

The copper strips on top of the shoes 22 are shown at 28, extending substantially throughout the length of the shoes; and beyond them, on each end, the shoes are provided with horns 29, curving downwardly to prevent the trolley wire becoming foul when, for any reason, the pantograph works well to one side.

Pantographs of this general construction are well known and the operation is familiar to all concerned. It should suffice to say that the pantograph may be folded from the position shown in Figs. 1 and 2 to lie flat against the top of the locomotive or car. It may be raised by compressed air, or other power, to yieldingly stand at a suitable height to maintain proper contact between the shoes and the trolley wire. The lever supports and the springs 24 give the shoes an additional flexibility of mounting, enabling them to accommodate the conditions of the road and prevent sparking, etc.

The present embodiment of this invention is shown as an attachment to such a pantograph as had been described. This attachment includes two brackets 30, shown in perspective in Fig. 8, and each has three slots 31, 32, and 33, to receive pins or fulcra 34, 35 and 36, which are substituted for support pins in the old pantograph. The principal distinction between the pins 34 and 35, and those they replace, is a slight increase in length, and the provision of heads 37; and the chief difference between the pin 36 and the one it replaces is an extension 38, by which it is made to project into the slot 33.

Each bracket 30 has a laterally projecting fulcrum arm comprising two flanges 39, connected by a web 40, and the flanges are perforated at 41 to receive a fulcrum pin 42 for a lever support 43, like the lever supports 21, and the upper end of each lever support 43 carries a pivot pin 44, which is received in slots in a pair of angle brackets 45, secured to the bottom of a channel-shaped auxiliary shoe 46, on the upper side of which is a slab or strip 47, of a lubricating composition.

One bracket 30 is placed on the inner side of each pair of upper frame castings 17, whereby the auxiliary shoe is supported between the two main contact shoes.

The fulcrum pins 42 are equipped with springs 24ª, similar to but weaker than the springs 24, which urge the auxiliary shoe upwardly. Each web 40 is perforated at 48, and each lever support 43 is perforated at 49, to receive a bolt 50 equipped with a wing nut 51. By adjusting the wing nut substantially as shown in the drawings, the upward movement of the auxiliary shoe is restrained so that the shoulder 26 is prevented from reaching the underside of the auxiliary shoe.

This arrangement permits the use of standard lever supports for the auxiliary contact shoe, while at the same time restraining it from reaching the elevation corresponding to the top position of the main contact shoes, whereby, in raising the pantograph, the auxiliary lubricating shoe is kept out of contact with the trolley until the main contact shoes have closed the circuit, and in lowering the pantograph the auxiliary shoe is taken out of contact with the trolley before the circuit is broken. Hence there is no arcing between the auxiliary shoe and the trolley, and no undue heating of the lubricant.

The use of lighter springs for supporting the auxiliary shoe provides for a light wiping contact of the lubricant with the trolley wire without materially diminishing the pressure of the contact shoes thereagainst.

It follows from the above that the auxiliary shoe, two lever supports with pivots, spring and restraining bolts, and three substitute pins, form a commercial unit which may be made and sold as an attachment for existing pantographs. It is, however, contemplated that the invention may be embodied in various forms with the desired pantograph structure for original equipment on electric locomotives and cars.

Preferably the lubricating strip is reinforced by an embedded reticulated insert 52, extending from end to end and side to side, and located near the bottom face of the strip. The strip is attached to the shoe 46 by means of countersunk bolts 53, and the pressure of these bolts is distributed through the body of the strip by means of metal plates 54, located on top of the reinforcing insert and extending across the strip, and being apertured to receive an attaching bolt.

The composition of the lubricant slabs or strips 47 that has been satisfactory in use on the lines of the Chicago, Milwaukee, St. Paul and Pacific R. R. Company is made of 35 to 40 per cent flake graphite, 60 to 65 per cent of fuller's earth, mixed with varnish, and linseed oil molded, dried and baked.

The graphite and fuller's earth are first mixed dry, then the varnish and linseed oil are added and the whole stirred until the mass is sufficiently plastic to readily mold. It is then placed in sheet metal pans, or forms, lined with waxed paper, and within which the reinforcing insert and pressure distributing plates have been positioned, tamped down, struck off, and dried for eight to twelve hours at room temperature. Later it is baked at 350° F. from six to twelve hours, or until the volatiles are driven off and the mass is comparably hard. The lining of waxed paper makes it easy to remove the strips from the mold.

I claim as my invention—

1. A pantograph trolley comprising a movable framework, a main contact shoe, yielding lever supports connecting the shoe and the framework, an auxiliary independent lubricating shoe, auxiliary yielding lever supports connecting the auxiliary shoe and the framework, and pivoted to swing about axes transverse to the axes of the first-mentioned lever supports, both of the named shoes being engageable with a conductor.

2. An attachment for sliding shoe pantograph trolleys which have a movable framework carrying a contact shoe, the attachment comprising two brackets each having elongated openings to receive pivot pins on the framework, a fulcrum arm on each bracket, a lever support pivoted on each arm, and an auxiliary lubricating shoe carried by the lever supports, both shoes being engageable with a conductor.

3. A pantograph trolley comprising a supporting frame, brackets mounted on the frame, a pair of spring elevated arms projecting oppositely from each bracket, conductor engaging current collecting shoes each hinged to the outer ends of the arms projecting in the same direction from the brackets, a pair of spring elevated arms projecting from the adjacent sides of the two brackets, and a lubricating shoe mounted on the outer ends of the last-named pair of arms for engaging the conductor.

4. A pantograph trolley comprising a supporting frame, brackets mounted on the frame, a pair of spring elevated arms projecting oppositely from each bracket, conductor engaging current collecting shoes each hinged to the outer ends of the arms projecting in the same direction from the brackets, a pair of spring elevated arms projecting from the adjacent sides of the two brackets, and a lubricating shoe mounted on the outer ends of the last-named pair of arms for engaging the conductor, the upward range of movement of the lubricating shoe being less than that of the collecting shoes.

5. In a pantograph trolley of the type wherein a current collector shoe is mounted on a lever which is pivoted on a supporting structure, the combination of an additional lever pivoted on said supporting structure to swing about an axis transverse to that about which the first named lever pivots, said levers being similar and interchangeable, and an additional shoe carried by said additional lever, one of said shoes including material for lubricating a trolley wire engaged by both shoes.

6. In a pantograph trolley of the type wherein a current collector shoe is mounted on a plurality of levers which are fulcrumed about parallel pivots on a supporting structure, the combination of an additional lever pivoted on said supporting structure to swing about an axis transverse to those about which the first named levers pivot, all of said levers being similar and interchangeable, and an additional shoe carried by said additional lever, one of said shoes including material for lubricating a trolley wire engaged by both shoes.

7. In a trolley, a supporting framework, a lever, a pivot pin mounting one end of the lever on the framework, a current collector shoe carried by the other end of the lever, a bracket carried by said pin, a lever pivoted on said bracket to turn about an axis transverse to that of said pivot pin, and an auxiliary shoe carried by the last named lever, both shoes being engageable with a conductor wire, and one of said shoes including material for lubricating said wire.

8. In a trolley, a supporting structure, a pair of contact shoes, and means mounting said shoes on the supporting structure including a plurality of arms extending in one direction from the supporting structure to one of the shoes, and a pair of other arms extending oppositely from the supporting structure in a vertical plane substantially parallel to that of the last named shoe and supporting said other shoe, one of said shoes including material for lubricating a trolley wire engaged by both shoes.

9. In a trolley, a supporting structure, an auxiliary shoe and two current collector shoes, and means mounting said shoes on the supporting structure including two pairs of arms extending oppositely from the supporting structure, an arm of each pair being connected to one of the collector shoes, and another pair of arms extending oppositely from the supporting structure, one from a point adjacent each of the first named pairs of arms, in a vertical plane generally parallel to those of the collector shoes, each arm of said last named pair being connected to and supporting said auxiliary shoe between and parallel to said collector shoes.

10. In a trolley, a supporting structure, two current collector shoes and an auxiliary shoe, said auxiliary shoe including material for applying lubricant to a trolley wire, and means mounting said shoes on the supporting structure including two pairs of arms extending oppositely from the supporting structure, an arm of each pair being connected to one of the collector shoes, and another pair of arms extending oppositely from the supporting structure, one from a point adjacent each of the first named pairs of arms, in a vertical plane generally parallel to those of the collector shoes, each arm of said last named pair being connected to and supporting said auxiliary shoe between and parallel to said collector shoes.

HOMER W. WILLIAMS.

CERTIFICATE OF CORRECTION.

Patent No. 2,073,189.                                          March 9, 1937.

HOMER W. WILLIAMS.

It is hereby certified that error appears in the printed specification of the above numbered patent requiring correction as follows: Page 2, second column, line 24, claim 1, for the words "auxiliary independent" read independent auxiliary; and that the said Letters Patent should be read with this correction therein that the same may conform to the record of the case in the Patent Office.

Signed and sealed this 6th day of April, A. D. 1937.

(Seal)

Henry Van Arsdale
Acting Commissioner of Patents.